United States Patent
Pond

(10) Patent No.: US 7,273,117 B2
(45) Date of Patent: Sep. 25, 2007

(54) VEHICLE SUSPENSION APPARATUS

(75) Inventor: James Pond, Twin Lake, MI (US)

(73) Assignee: General Dynamics Land Systems, Inc., Sterling Heights, MI (US)

(*) Notice: Subject to any disclaimer, the term of this patent is extended or adjusted under 35 U.S.C. 154(b) by 404 days.

(21) Appl. No.: 10/846,919

(22) Filed: May 17, 2004

(65) Prior Publication Data

US 2005/0051990 A1    Mar. 10, 2005

Related U.S. Application Data

(60) Provisional application No. 60/470,436, filed on May 15, 2003.

(51) Int. Cl.
*B60G 3/12*     (2006.01)
*B60K 1/00*     (2006.01)

(52) U.S. Cl. ............ 180/24.02; 180/65.5; 280/6.156; 280/124.128; 280/124.129

(58) Field of Classification Search ......... 280/124.128, 280/124.129, 124.132, 5.507, 6.156; 180/24.02, 180/65.5, 24.05, 24.07, 24.08, 308
See application file for complete search history.

(56) References Cited

U.S. PATENT DOCUMENTS

| | | | |
|---|---|---|---|
| 3,175,637 A | 3/1965 | Honda | |
| 3,374,005 A | 3/1968 | Donlon et al. | |
| 3,761,109 A * | 9/1973 | Campbell | ............ 280/124.128 |
| 3,913,939 A | 10/1975 | Sinclair et al. | |
| 3,930,550 A | 1/1976 | Rose et al. | |
| 4,063,611 A | 12/1977 | Anderson | |
| 4,090,723 A | 5/1978 | Hart | |
| 4,156,536 A | 5/1979 | Brandstadter | |
| 4,447,073 A | 5/1984 | Brandstadter | |
| 4,595,069 A | 6/1986 | Oswald et al. | |
| 4,600,069 A | 7/1986 | Oswald et al. | |
| 4,647,067 A | 3/1987 | Paquette et al. | |
| 4,721,327 A | 1/1988 | Chauveau et al. | |
| 4,721,328 A | 1/1988 | Chauveau et al. | |
| 5,183,287 A | 2/1993 | VanSweden | |
| 5,324,065 A | 6/1994 | Derrien et al. | |
| 5,639,110 A * | 6/1997 | Pierce et al. | .......... 280/124.116 |
| 5,960,901 A | 10/1999 | Hanagan | |
| 6,357,766 B1 | 3/2002 | Hall et al. | |
| 6,357,776 B1 | 3/2002 | Goertzen et al. | |
| 6,435,491 B1 | 8/2002 | Blondelet et al. | |
| 6,761,371 B1 * | 7/2004 | Heyring et al. | ....... 280/124.157 |
| 6,789,810 B2 * | 9/2004 | Strong | ................ 280/124.128 |
| 2002/0113395 A1 | 8/2002 | Eriksson et al. | |

* cited by examiner

*Primary Examiner*—Ruth Ilan
(74) *Attorney, Agent, or Firm*—Kaye Scholer LLP

(57) ABSTRACT

A trailing arm suspension unit for use on a vehicle including a ring bearing, a trailing arm, a spring and damper for providing large vertical wheel travel in a jounce and rebound suspension condition. The ring bearing may include external threads for rotationally connecting the trailing arm to a mounting plate or a hull of the vehicle. Further, supply lines for electrical and fluids may be passed through the opening in the ring bearings without the use of a slip ring and passed through a passage in the trailing arm to a wheel on the vehicle. The spring and damper may be located on top of the trailing arm and separately connected to the mounting plate to generate significant mechanical advantage. The geometry of the spring, damper, and trailing arm allow the spring in the suspension unit to be gas cylinder employing air.

12 Claims, 11 Drawing Sheets

VEHICLE SUSPENSION APPARATUS

CROSS REFERENCE TO RELATED APPLICATIONS

This application takes priority from U.S. non-provisional application Ser. No. 60/470,436 filed May 15, 2003, which provisional application is herein incorporated by reference.

BACKGROUND OF THE RELATED ART

This invention relates generally to vehicle suspension systems, and more particularly to an external trailing arm pneumatic suspension with integral accommodations for electric or gear driven wheel ends.

Conventional trailing arm suspension devices are known and used in vehicles designed for rugged terrain and severe conditions. For example, trailing arm suspensions have long been used on tanks, providing long vertical travel suspension for use under military conditions. A single unit of a trailing arm suspension system typically includes a mounting plate connecting a swing arm to a hull of a vehicle and a hub or wheel spindle at the end of the swing arm for connecting a wheel to the suspension system. Shocks and springs act on the swing arm to control the characteristics of the suspension system and are located within the swing arm or trailing arm, resulting in poor mechanical advantage. Further, gas springs, operated with nitrogen, are often used in the suspension units. Unfortunately, a notable logistics burden results from the use of nitrogen when the vehicle is far from home or a ready source of pressurized nitrogen.

Traditional trailing arm suspension systems are also bulky and require significant space to accommodate the structure requirements of the trailing arm suspension. The mounting plates of traditional trailing arm suspensions require precious needed space between the wheel and the hull of the vehicle to connect large bearing flanges on hollow or ring bearings. The mounting plates are also expensive to employ because of the need to manufacture separate plates for different positions and on different sides of the hull of the vehicle. Further, electrical, pneumatic, and/or mechanical gears and shafts require routing and special considerations to avoid conflicts with the mounting plates and exposure to rocks, debris, and ordinance under operating conditions.

Traditional trailing arm suspension systems also lack efficient connection systems for electrical, coolant, and mechanical connections that are protected between the hull and the wheel and do not leak fluids. For electrical drive applications, traditional systems do not provide direct plug-in connectors for cables while allowing flexing during arm rotation and vertical wheel movement.

Therefore, what is needed is a trailing arm suspension system including a geometry capable of maximizing mechanical advantage of the spring and damper forces, a reduced and efficient connection from the trailing arm to the bearing to the mounting plate, and an efficient and reliable connection of mechanical or electrical power between the hull of a vehicle and a wheel.

SUMMARY OF THE INVENTION

In a first aspect, the present invention includes a trailing arm suspension system interfaced between a hull of a vehicle and a wheel of the vehicle. The suspension system includes a trailing arm element having a first end and a second end and a passage therein. The trailing arm element also includes a wheel mount positioned between the first end and the second end of the trailing arm element and connected to the passage of the trailing arm element. The suspension system also includes a spring element and a damper element. The spring element includes a first end and a second end wherein the second end of the spring element is attached to the second end of the trailing arm and the damper element includes a first end and a second end wherein the second end of the damper element is attached to the second end of the trailing arm. The spring element and the damper element are positioned external to and above the trailing arm element.

In an embodiment of the present invention, the suspension system further includes a ring bearing and a mounting plate wherein the trailing arm element and the mounting plate are rotationally connected by the ring bearing. The ring bearing may also include a first set of external threads which are structured and arranged to secure the bearing to the trailing arm element. The ring bearing may include a second set of external threads which are structured and arranged to secure the ring bearing to the mounting plate.

In yet another embodiment, the mounting plate is symmetrical about at least one axis.

In still another embodiment of the present invention, a plurality of supply lines may pass through the ring bearing and the passage of the trailing arm element. The suspension system may also include a wheel assembly mounted to the wheel mount and a plurality of connectors connecting the plurality of supply lines to the wheel assembly. A spindle may also be included on the wheel mount and the plurality of connectors may be structured and arranged about the spindle. The suspension system may include in the wheel assembly an electric drive motor.

In another embodiment, the ring bearing and the wheel mount may be connected by a mechanical transmission passing through the ring bearing and the passage of the trailing arm element.

In still another embodiment, the suspension system may include a gas piston cylinder as the spring element. The gas piston cylinder may include a dual-acting air cylinder with air independently supplied to both sides of the gas cylinder piston. Further, the damper element may be positioned above and substantially parallel to the spring element.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION

Figure 1:
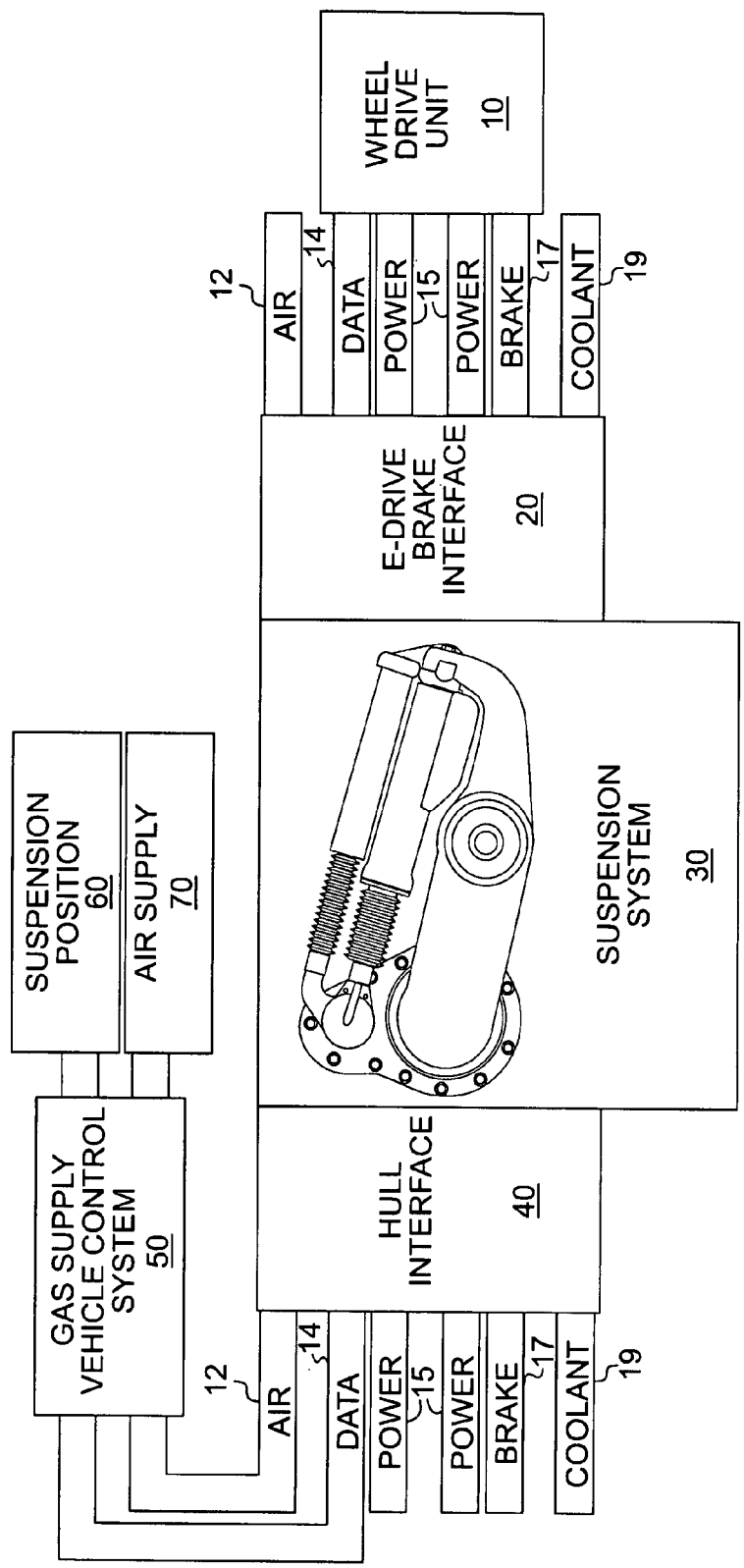
FIG. 1 is a schematic of the suspension system according to one aspect of the invention.

For simplicity and illustrative purposes, the principles of the present invention are described by referring mainly to the exemplary embodiment thereof. However, one of ordinary skill in the art would readily recognize that the same principles are equally applicable to, and can be implemented in, many types of systems involving trailing arm suspensions or other similar devices, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims.

An embodiment of the invention generally relates to a structure or apparatus for the deployment of a trailing arm suspension system. In embodiments of the invention, the suspension system may comprise a plurality of trailing arm suspension units. The number of units depends on performance requirements and/or configuration constraints, of the system or the vehicle in which the suspension system is deployed.

In one embodiment of the present invention, the suspension system includes a plurality of trailing arm units mounted on a vehicle. Each unit may include a mounting plate, a trailing arm, wheel spindle, and a spring and damper. Embodiments of the invention may also include full symmetry of the mount plate such that the plate may be mounted on either side of a vehicle. The trailing arm may be rotatably attached to the mounting plate using a hollow bearing. Also, the damper and shock may be rotatably attached to the mounting plate. The connections of the trailing arm to the mounting plate and the damper and spring to the mounting plate may be spaced such that the suspension geometry creates a substantial mechanical advantage for the spring and damper. Between the connection of the trailing arm and the mounting plate and the connection of the trailing arm and the damper and spring, a hub or wheel spindle may be positioned for attachment of an electric drive motor or mechanical gears for driving a wheel or other device.

The units of the suspension system may also include the use of an air spring. The arrangement of the damper may include a "piggy-back" or "top" configuration/position over the air spring, providing easy access and maintenance capability for replacing or fixing the spring and damper. It is contemplated that the damper may be a typical automotive hydraulic damper. The damper may also be replaced with an actively controlled actuator. Although the spring may preferably use air as its working medium, other fluids and gases may be used in the spring of the suspension units without deviating from the present invention.

It should be noted that the adoption of air gas in the spring or gas cylinder in place of traditional nitrogen may eliminate the logistics burden of providing high pressure nitrogen in rugged terrain or under difficult circumstances. Air may be supplied by currently well known air delivery systems to each of the suspension units on the vehicle and the air pressure may be automatically controlled to adjust the characteristics of the suspension. The use of air may also make the introduction of cost effective gas seals possible and practical, allowing the adoption of an air-operated height/attitude management system that avoids reliance on more expensive and fallible seals, often required with the use of other gases. The spring or gas cylinder may also employ a dual-acting air cylinder approach with air independently supplied to both sides of the gas cylinder piston, allowing optimization of jounce and rebound spring characteristics. Although air in a dual acting suspension spring is contemplated as the preferred configuration for the spring of the suspension unit, nitrogen may be used or other suitable gas for the dual acting or single acting springs without deviating from the true scope and spirit of the present invention.

An embodiment of the present invention may also include a hollow trailing arm and a hollow bearing connecting the trailing arm to the mounting plate. This hollow feature of the bearing and trailing arm may allow the trailing arm suspension unit to accommodate an electrical drive system or a mechanical drive system. The hollow characteristic may also allow important "feed" lines such as electrical and coolant lines to pass through the hollow bearing and through the hollow trailing arm without the use of slip rings or other such devices. The hub or wheel spindle may also include the use of self-sealing electrical and coolant connections to an electrical motor, mounted on the hub and located in the hub of a wheel.

In one embodiment of the present invention, it is contemplated that the suspension unit may rotate approximately 80 degrees, providing about 18 inches of vertical travel relative to the ground. Typical settings for cross-country operation have the unit positioned to provide about 13 inches of travel in the jounce condition and about 5 inches of travel in the rebound condition. The suspension may be adjusted to different heights by controlling the pressure in the spring of the suspension unit to raise and lower the suspension unit over the about 18 inches of travel. This travel may allow the vehicle to set a wide range of bottom clearance heights for a vehicle and, at all but the extreme ends of the suspension travel, the suspension unit may continue to provide spring and damper performance.

Further, the suspension unit's geometry may generate significant mechanical advantage due to the positioning of the spring and the damper above the trailing arm. This positioning may allow the efficient use of air in lieu of other gases or fluids, while permitting high wheel travel in both the jounce and rebound conditions. This mechanical advantage may also permit static air pressure of the spring to be about 1000 psi, whereas traditional designs are usually closer to 2000 psi. This lower static pressure reduces the maximum pressure experienced at full jounce to about 4000 psi whereas traditional designs are usually closer to 8,000–10,000 psi, a challenging pressure for seals and sealing.

It is also contemplated that an embodiment of the present invention may include jounce and rebound stops (with nonmetallic pads) integrated into the mounting plate and suspension arm to prevent the suspension spring and damper from being overly extended or compressed. A compressible sleeve on the air actuator shaft may also snub the final inch of actuator shaft translation, further protecting the suspension unit against over-travel.

The mounting plate, trailing arm, and other structures of the trailing arm suspension each may be implemented using, but not limited to, titanium, aluminum, invar, graphite epoxy, plastic, composites, silicon carbide, shape memory materials, rigidizable materials and other similar materials. Individual components of the assembly need not all be made from the same material. The trailing arm may have a design of a tube, box, truss, enclosed I-beam, isogrid, inflatable rigidizable, shape memory design or other similar design. The rotatable connections may also include actively controlled actuators, e.g., motors that may be actuated or passive, non-actuated joints.

It should be noted that the trailing arm suspension unit may also be employed on a vehicle in a leading arm configuration. In such a configuration, the suspension arm may be directed toward the front of the vehicle without deviating from the scope and spirit of the present invention.

Referring now to FIG. 1, there is shown a schematic of the suspension system according to one aspect of the invention. A wheel drive unit or wheel assembly 10 is shown connected to an e-drive brake interface 20 by connection lines of air 12, data 14, power 15, brake 17 and coolant 19. The e-drive 20 and the wheel drive 10 may be connected to the hull 40 of a vehicle by the suspension system and particularly a unit of the trailing arm suspension system 30.

The characteristics of the suspension system 30 may be at least partially controlled by the gas supply vehicle control system 50, which controls the amount of air 12 supplied to the spring and damper. The suspension position 60 may report the position of the wheel from one or more suspension units to the gas supply vehicle control system or height control system 50 to be used in controlling the amount of air delivered from the air supply 70 to the suspension system 30. The power 15, brake 17 and coolant 19 lines may be controlled by conventional onboard systems (not shown).

Figure 2:
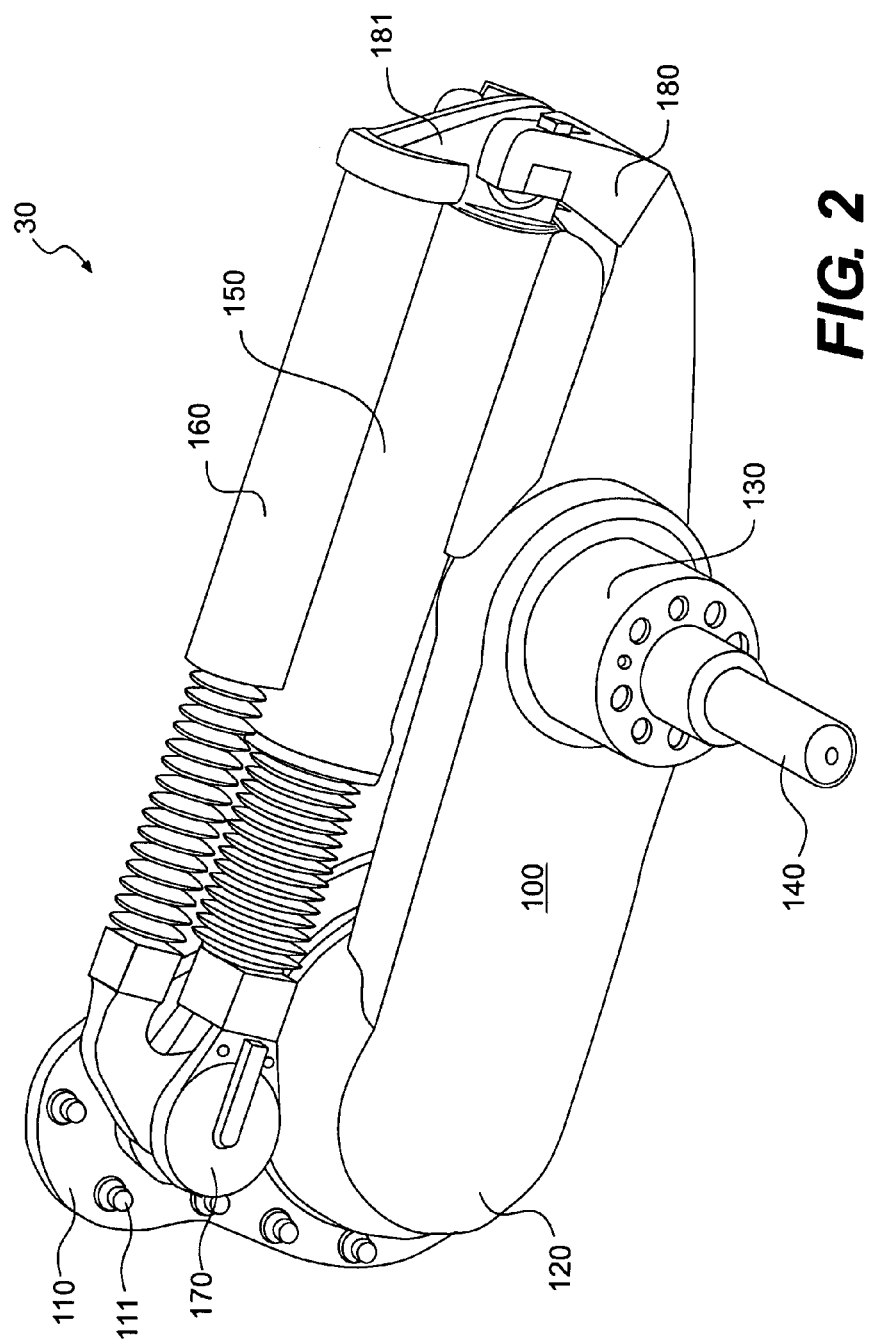
FIG. 2 is a perspective view of the suspension system according to one aspect of the invention.

In FIG. 2, a perspective view of the suspension system according to one aspect of the invention is shown. A suspension unit 30 may include the trailing arm or road arm 100 attached to a mounting plate 110. The trailing arm 100 may include a rotatable connection 120 for securing the trailing arm 100 to the mounting plate 110. Mounting plate 110 may be symmetrical for use on either side of a vehicle. The mounting plate 110 may be secured to the hull of a vehicle using the fasteners 111.

The trailing arm 100 also includes a hub or wheel mount 130 and a wheel spindle 140. Beyond the wheel mount 130, the trailing arm 100 includes a mount 180 for attaching the spring 150 and the damper 160. The spring 150 and the damper 160 is attached to the trailing arm 100 using the mounting bracket 181 and also be attached to the mounting plate 110 and the rotatable connection 170 using the mounting bracket 173. The spring 150 and the damper 160 may also be directly connected to the trailing arm 100 and the mounting plate 110.

The spring 150 may be an external gas piston cylinder and the damper 160 may be a piggy-backed damper cylinder pinned to the trailing arm 100 and the mounting plate 110. The damper 160 may be a passive damper or an active damper as desired or necessary for a particular application. The configuration shown in FIG. 2 may provide over 18 inches of vertical wheel travel and provide easy access and replacement ability of the spring 150 and the damper 160.

Figure 3:
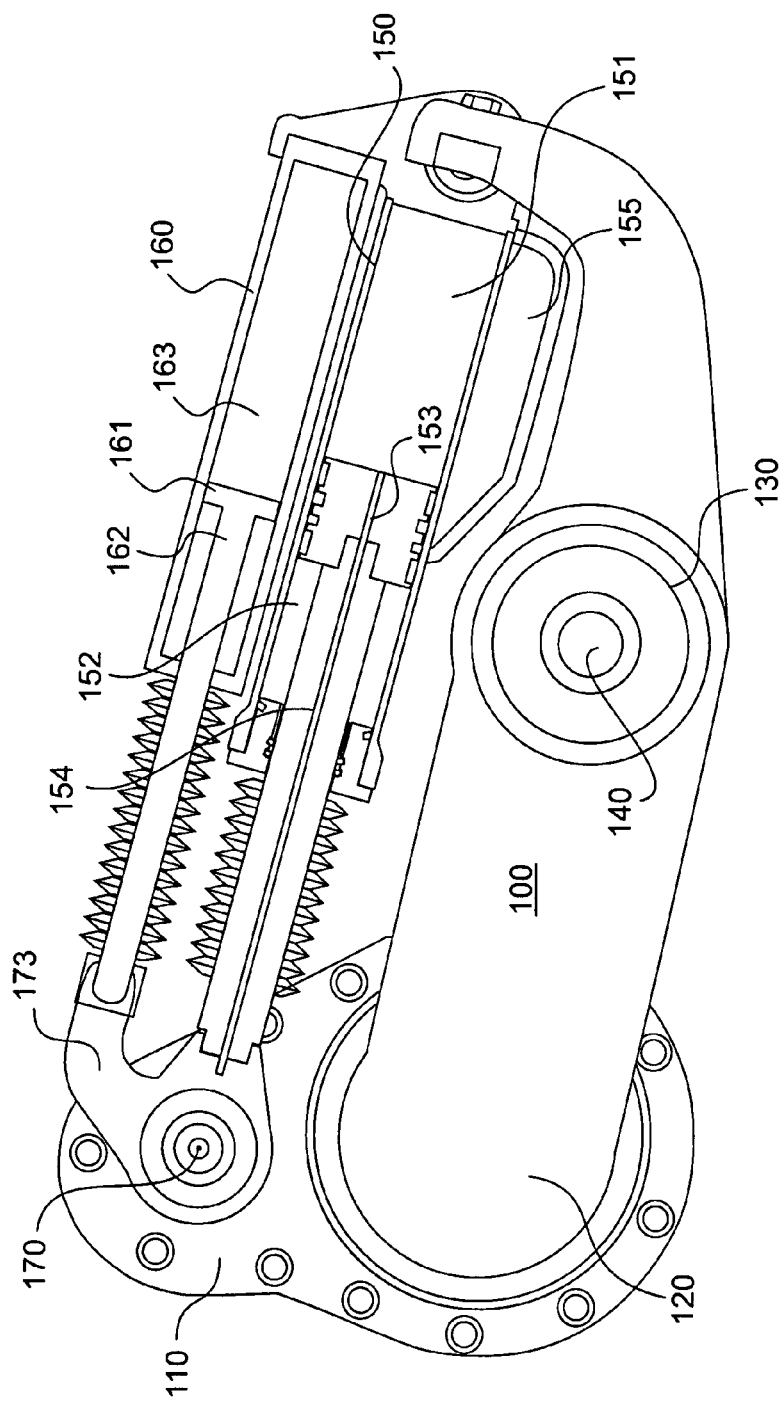
FIG. 3 is a side view with a partial cut-away of the suspension system, and in particular the spring and damper of the suspension system shown in FIG. 2.

Referring to FIG. 3, a partial cut-away view of the spring and damper of the suspension system according to one aspect of the invention is shown. The spring 150 may have an actuator pressure 151 and a back pressure 152 on either side of a cylinder 153. The cylinder 153 may be connected to a piston 154 that connects to the rotatable connection 170. The rotatable connection 170 may include a multi-port assembly for directing air into the actuator pressure 151 and the back pressure 152. The damper 160 is also shown in FIG. 3 and includes a cylinder 161 and a piston 162. The piston 162 may be connected to the rotatable connection 170 along with the spring 150. The damper 160 also includes a working fluid 163. Although it is contemplated that the damper 160 may be a typical automotive shock, the damper 160 may include other dampers and working fluids without deviating from the scope and spirit of the present invention.

Figure 7:
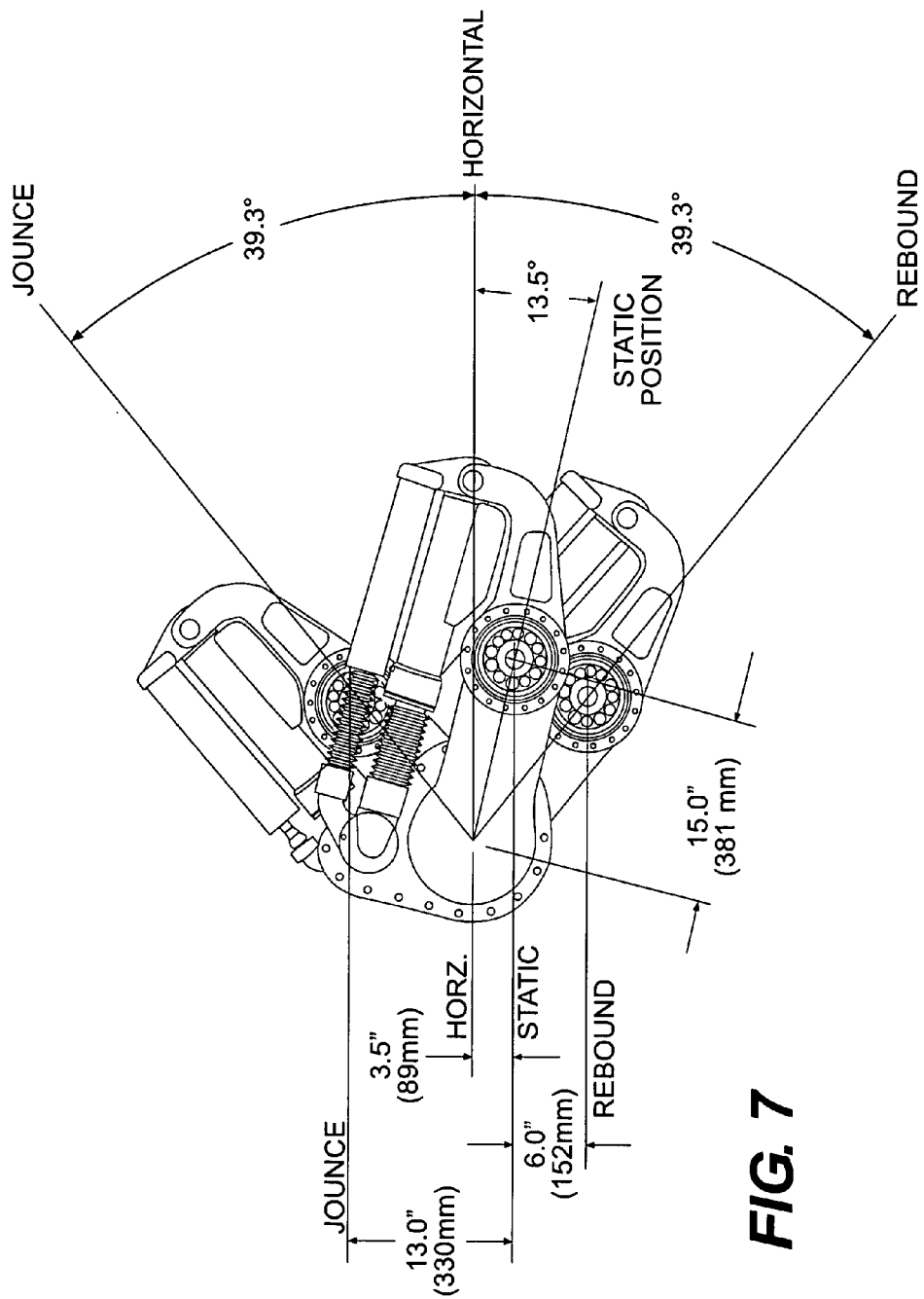
FIG. 7 is a side view of the suspension system of FIG. 2 in three positions of movement relative to a static position.

It should be noted that the geometry of the connections 120 and 170 and the attachment of the spring 150 and the damper 160 at the mount 180 allow the spring 150 and the damper 160 to generate significant mechanical advantage for exerting forces from the spring 150 and the damper 160. This mechanical advantage provides not only for the large vertical wheel travel of the suspension unit 30, as shown in FIG. 7, but also provides the capability of using air in the spring 150 instead of other working gases or fluids. An additional volume 155 is shown in FIG. 3 and may be used to provide additional volume to the actuator pressure 151 to improve or adjust the performance of the spring 150.

Figure 4:
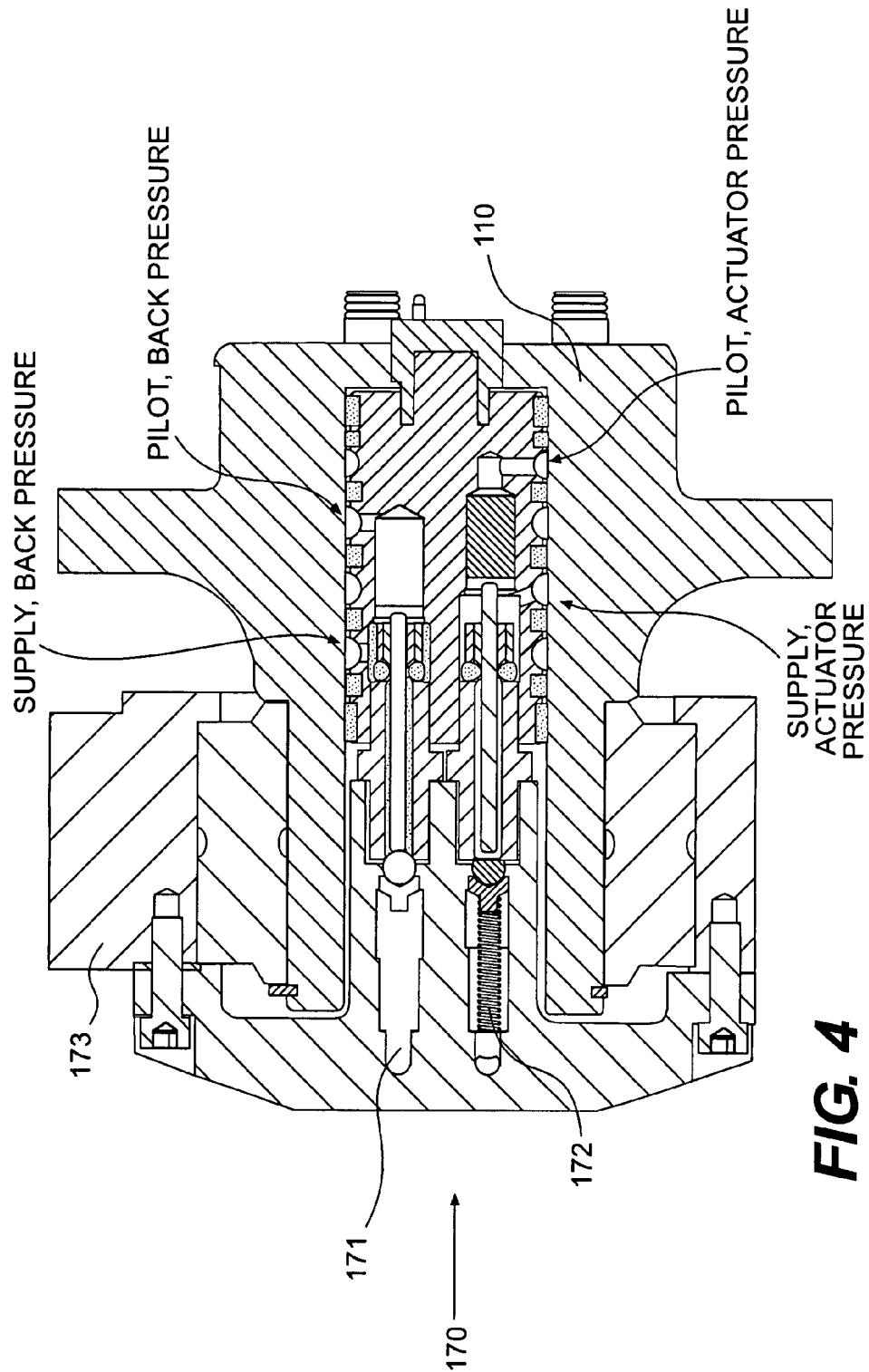
FIG. 4 is a cross-sectional view of the multi-port assembly and rotatable connection for the spring and damper according to one aspect of the invention.

In FIG. 4, the rotatable connection or multi-port assembly 170 is shown. The connection 170 may supply air to the spring 150 when an air spring is employed on the suspension system. Air may be fed from the gas supply vehicle control system 50 and the air supply 70 into the actuator pressure 151 and the back pressure 152. The connection 170 may also allow pressure to be exhausted from the actuator pressure 151 or the back pressure 152 in order to adjust or control the suspension characteristics.

Air may be entered or exhausted via pilot operated check valves 171 and 172, which require a minimum pilot pressure to activate the valve and allow pressure to be removed or added through the valve. Valve 171 connects the back pressure 152 of the air spring 150 to the gas supply vehicle control system 50 and the air supply 70. Valve 172 connects the actuator pressure 151 to the gas supply vehicle control system 50 and the air supply 70. The valves 171 and 172 require pilot pressure to operate as a fail safe to avoid unwanted loss of pressure in case of air supply failure. Without pilot pressure, the suspension unit 30 and the spring 150 are isolated from the vehicle and the air supply 70 such that no leakage into or out of the suspension unit 30 is possible (fail safe mode). This technique protects the suspension unit 30 and/or the vehicle air system shown in FIG. 1 from being drained down if a major leak occurs. It is contemplated that the air pressure in the spring 150 can be supplemented or reduced at any time but more preferably when the vehicle is stationary or moving slowly.

Air may be fed through the valves 171 and 172, through a slip ring, and down passages in the spring piston shaft 154. The passages in the piston 154 may directly connect to opposite sides of the cylinder 153, the actuator pressure 151 and the back pressure 152. This double acting air cylinder approach allows the spring's characteristics to be tuned to get the best spring rate characteristics for a given circumstance. Typical pressures may be 1000 psi in the actuator pressure 151 and 400 psi in the back pressure 152. Increasing actuator pressure 151 will cause the unit to push harder on the ground, thus helping to raise the vehicle. Increasing back pressure 152 will make the suspension feel stiffer and be less inclined to lean during a turning maneuver. It is contemplated that the back pressure 152 is typically set once and left until a maintenance check. However, it can be adjusted any time.

Figure 5:
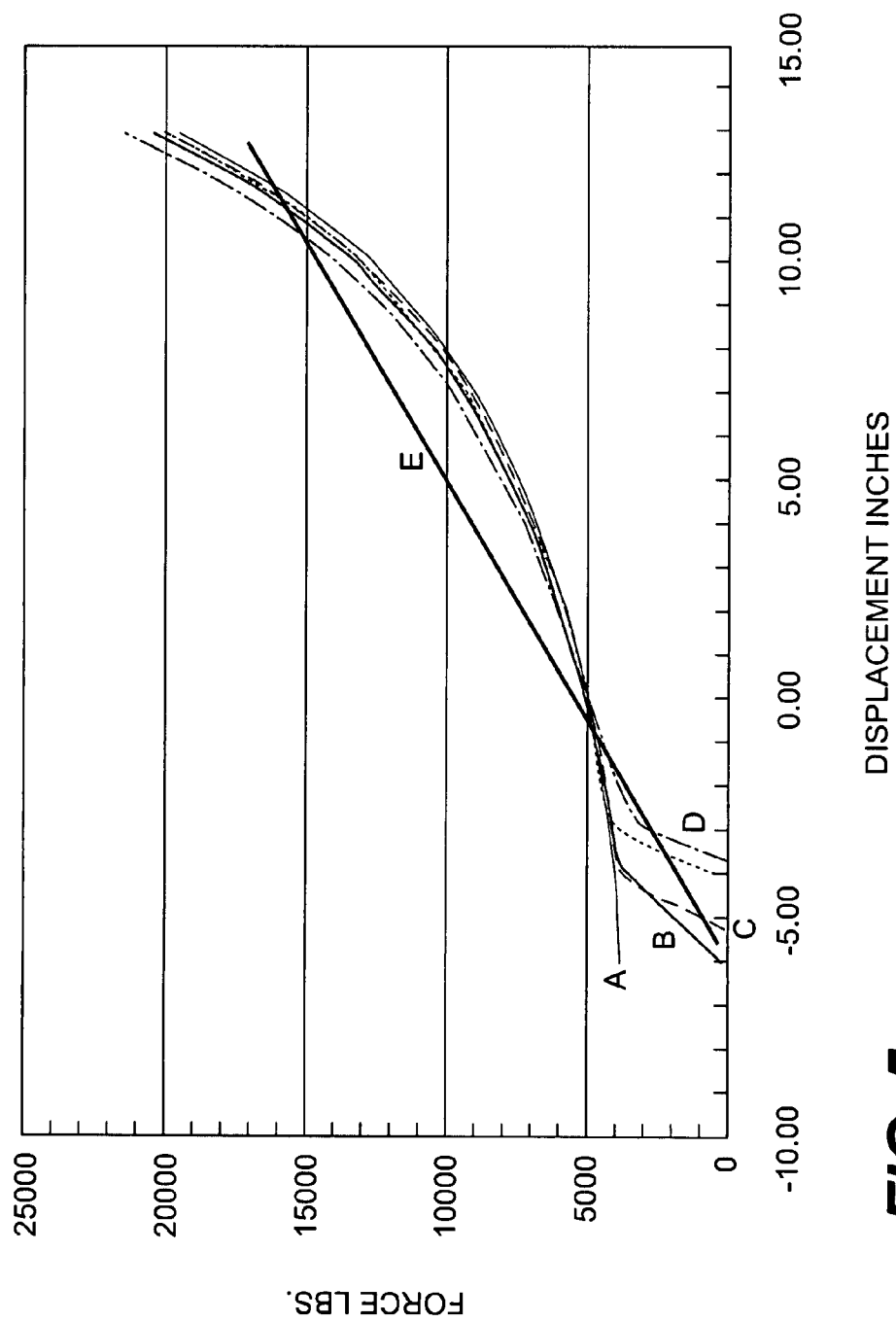
FIG. 5 is a graph comparing the spring performance traits of single acting air springs and dual acting air springs according to one aspect of the invention with the spring performance traits of linear springs.

In FIG. 5, the double acting, non-linear pneumatic suspension's unique rebound roll-off traits are shown and compared to a single acting unit and to a typical linear (metal) spring. The graph displays the displacement of the suspension unit 30 on the horizontal axis and force-lbs exerted by the suspension unit 30 against the ground on the vertical axis. The line A represents the single acting spring unit with no back pressure 152. The three different lines B, C, and D on the graph represent the spring characteristics of a dual-acting cylinder spring with different levels of back pressure 152, with line B having the least amount of back pressure 152 and line D having the greatest amount of back pressure 152. Finally, line E represents a typical linear spring.

When the suspension unit 30 is subjected to a vertical load, such as a bump during operation, the suspension unit 30 is displaced in the positive direction and the gas exerting the actuator pressure 151 is compressed. This positive displacement is known in the art as the jounce condition. As shown, the force-lbs exerted on the suspension unit 30 by the spring 150 dramatically increase with the positive rise in the displacement for each line A–D.

In the negative displacement or rebound condition, the lines separate as the gas exerting the back pressure 152 is compressed. Lines B, C, and D approach zero force-lbs due to the back pressure 152 resisting the rebound condition. The spring with the greatest back pressure 152, the line D, approaches zero first, the back pressure 152 canceling the force on the suspension unit 30 from the actuator pressure 151. The line B crosses zero at about 6 inches of negative displacement. It should be noted that the dual acting springs approximate the linear spring by falling off to zero force-lbs near the maximum rebound travel of the suspension unit 30.

However, without back pressure 152 to push against the actuator pressure 151 in the rebound condition, the single acting spring and line A do not approach zero within the range shown in the FIG. 5. Therefore, the spring characteristic of line A does not approximate the characteristics of a linear spring suspension at full extension in the rebound direction.

Therefore, the dual-acting springs are shown to have essentially a soft-hard nature in jounce as shown by the non-linear increase in force-lbs as the suspension unit reaches full extension in positive displacement. Unlike the single acting spring, the dual-acting spring emulates the linear spring in rebound by approaching zero at the full extension in negative displacement. It is contemplated that the actuator pressure 151 may be 1000 psi and the back pressure 152 may be 400 psi for the spring characteristics shown by line B.

The spring 150 and the back pressure 152 features may also include another important benefit. By increasing the back pressure 152, the suspension unit 30 may be retracted or raised. Thus, the back pressure 152 may be increased enough to raise a wheel attached to the suspension unit 30 off the ground such that the wheel may be removed to change a tire or perform maintenance on a single suspension unit 30 without raising the entire vehicle. Variable control of the back pressure 152 may also function to as raising/lowering mechanism for a vehicle's nose by controlling the back pressure 152 in multiple suspension units 30 in a vehicle. This variable control may be employed for uses such as attitude adjustment or control of a dozing blade.

It is contemplated that a rotary potentiometer may be positioned on the centerline of the pivoting axis of the rotatable connection 120, rotatable connection 170 or other rotating joints where the rotation of the suspension unit 30 may be measured. The rotary potentiometer may sense unit angle, which can be fed to the height control system to manage air flowing to or from the spring 150 by keeping track of the suspension unit 30 angle or displacement. It is also contemplated that load changes or temperature effects may be monitored via the rotary potentiometer and/or actuator air pressure. This load information, from the suspension units 30 on a vehicle, may be used by the height control system 50 to channel air into or out of the actuator pressure 151 and/or the back pressure 152 of the spring 150 when the spring 150 is not at its assigned angle.

Figure 6:
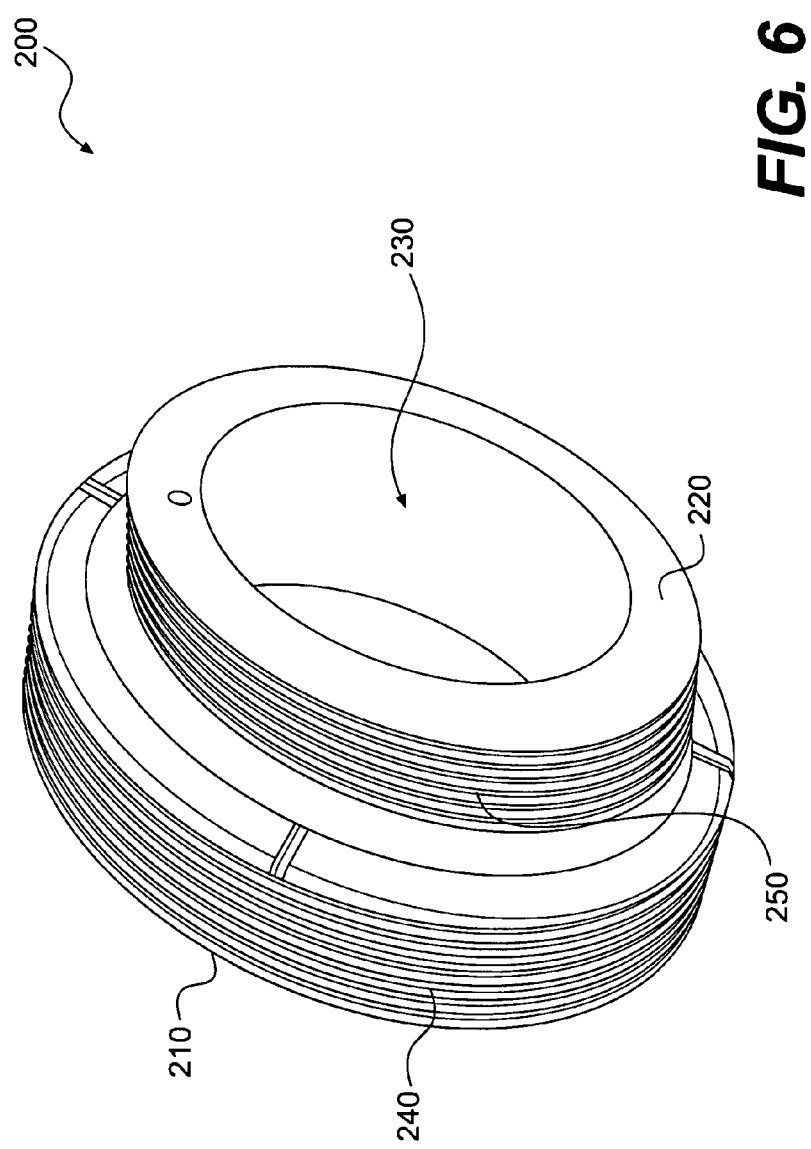
FIG. 6 is a perspective view of a bearing of the suspension system according to one aspect of the invention.

FIG. 6 shows a perspective view of a ring bearing of the suspension system according to one aspect of the invention. The bearing 200 includes a mounting plate side 220 and a trailing arm side 210. The bearing may also include a hollow center 230 for the passage of supply lines 300 or mechanical gears (not shown) through to the hollow center of the trailing arm 100. The bearing 200 also includes external threads 240 for detachably connecting the bearing 200 to the trailing arm 100 and external threads 250 for detachably connecting the bearing 200 to the mounting plate 110. It is contemplated that the hollow center 230 may include a 5.5 inch diameter hole through the bearing 200. The hollow center 230 is large enough to allow several power cables and coolant lines to be fed through the bearing 200 and the hollow trailing arm 100 to the wheel mount 130. The hollow center 230 may also large enough to allow a drive shaft to fit though for applications requiring gears instead of electrical power.

External threads 250 remove the need for a flange attachment of the bearing 200 to the mounting plate 110 or the trailing arm 100. Although the embodiments described herein include the use of external threads to attach the bearing 200 to the mounting plate 110 and the trailing arm 100, the bearing 200 may also be attached to the mounting plate 110 and the trailing arm 100 in other ways without deviating from the scope and spirit of the invention.

Figure 8:
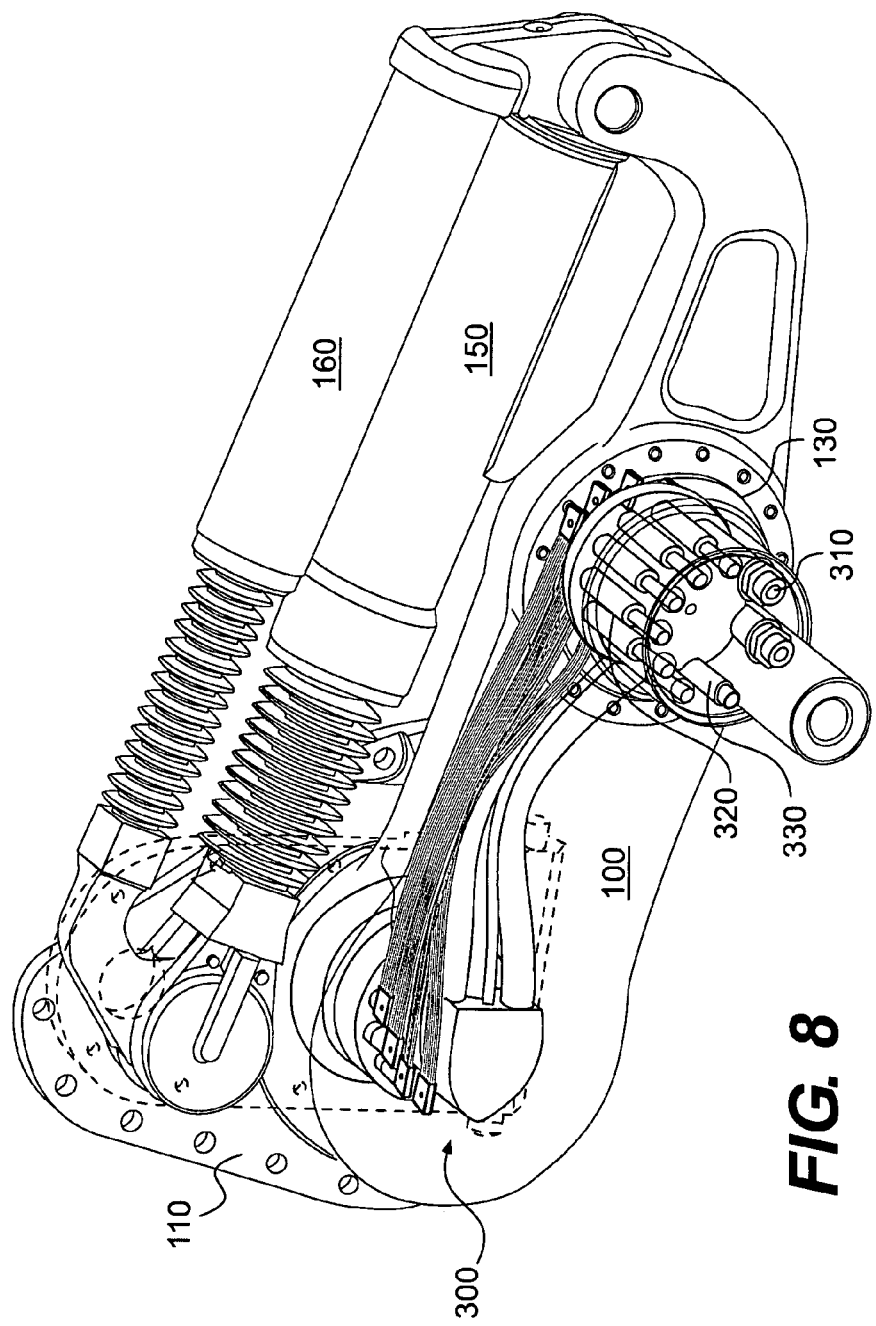
FIG. 8 is perspective view of the suspension system of FIG. 2 with elements of the suspension transparently shown.

It should be noted that the use of the external threads 240 and 250 on the bearing 200 allows the size of the center opening 230 to be maximized. Consequently the amount and size of supply lines 300, as shown in FIG. 8, may allow the transmission of adequate power and necessary fluids, for an electrical drive motor in the wheel assembly 10, through the bearing 200 without the use of slip rings for the power and fluids. Likewise, the size of the center opening 230 also allows for more efficient and reliable mechanical transmission through the bearing 200 and through the trailing arm 100, by providing sufficient space for enlarged drive shafts and gears.

In FIG. 7, another view of the suspension system according to one aspect of the invention is shown and the unit 30 is shown in a static position, jounce position, and rebound position. It should be noted that the vertical travel of wheel mount 130 is a function of the geometry of the suspension unit 30 and the distance between the rotatable connection 120 and the wheel mount 130. The amount of rotation of the trailing arm 100 may also be a function of the spatial relationship between the trailing arm 100 and the spring 150 and the damper 170. It is contemplated that the vertical travel in the jounce position to be approximately 13 inches with about 39.3 degrees of rotation above the horizontal. Further, the vertical travel in the rebound position may be approximately 6 inches with about 39.3 degrees of rotation below the horizontal. It should be noted that the static position of the trailing arm may rest at an angle of 13.5 degrees below the horizontal with the wheel hub 130 resting approximately 3.5 inches below the rotatable connection 120.

It is also contemplated that the range of vertical travel of the wheel mount 130 may be passively controlled with the spring 150 and the damper 160 and the geometry of the connections between the trailing arm 100, the spring 150, the damper 160, the connection 120 and the connection 170. However, it is also contemplated that the vertical travel may be actively controlled by dynamically adjusting the air pressure of the actuator pressure 151 and the back pressure 152 and active actuators in the damper 160.

In FIG. 8, a partial cut-away view of the suspension system according to one aspect of the invention is shown. It is contemplated that the trailing arm 100 may be hollow and carry within its structure supply lines 300 or mechanical gears (not shown in the drawings) from the rotatable connection 120 to the wheel mount 130. For use with an electrical drive within the hub of a wheel assembly 10, the supply lines 300, as shown in FIG. 3, pass through the hull, through the mounting plate 110, through a hollow bearing 200, and into the trailing arm 100. The supply lines 300 may include the supply lines indicated in FIG. 1. However, the number of supply lines 300 may be more or less than those shown in either FIG. 1 or FIG. 8. Further, the supply lines 300 may provide different types and numbers and different shapes and cross sections, including flat supply lines, in order to permit the trailing arm 100 to rotate about the connection 120 without deviating from the scope and spirit of the invention.

The supply lines 300 may be flexible and pass through the hollow trailing arm 100 to the wheel mount 130. The wheel mount 130 is shown as transparent in FIG. 8 such that the connections of the supply lines 300 to the wheel mount or hub 130 may be seen. The supply lines 300 may include a set of pins and connectors/disconnectors arranged around the wheel spindle 140 to allow direct plug in of a wheel assembly 10 with no leakage of fluids. It is contemplated that the set of pins and connectors will directly connect to matching connectors in the wheel assembly 10 and the electrical drive or electrical motor within the hub of the wheel assembly 10. The pins and disconnects may include different types and shapes of connectors for different types and numbers of supply lines 300. FIG. 8 also shows three possible types of self-sealing plug-in connectors 310, 320, and 330 of different sized for providing electrical and other fluids and supplies to the wheel assembly 10.

Figure 9:
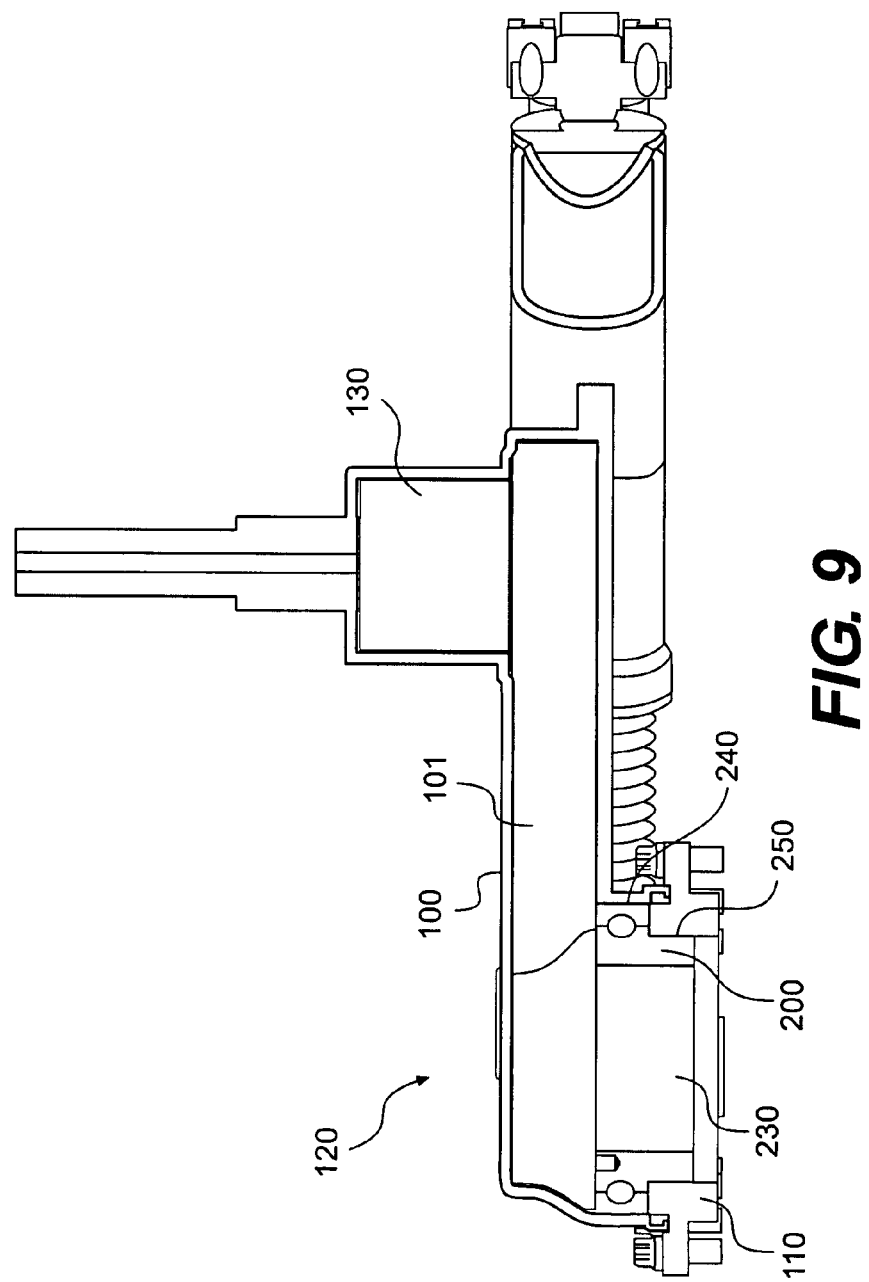
FIG. 9 is a bottom view with a partial cut-away of the suspension system, and in particular the mounting plate, bearing and trailing arm of the suspension system shown in FIG. 2.

In FIG. 9, a bottom view with a partial cut-away of the suspension system according to one aspect of the invention is shown. The trailing arm 100 and the bearing 200 are partially removed exposing the attachment of the trailing arm 100 to the bearing 200 and the hollow center 230. As seen in the FIG. 9, the connection of the mounting plate 110 to the bearing 200 does not require flanges or other mounting structures. As such, the overall diameter of the rotatable connection 120 may be effectively controlled while permitting the diameter of the hollow center 230 of the bearing 200 to be enlarged as much as possible. The hollow center 230 may therefore accommodate both electrical and mechanical power transfer through the hollow section 101 of the trailing arm 100 to the wheel mount 130 as illustrated in FIG. 8.

Figure 10:
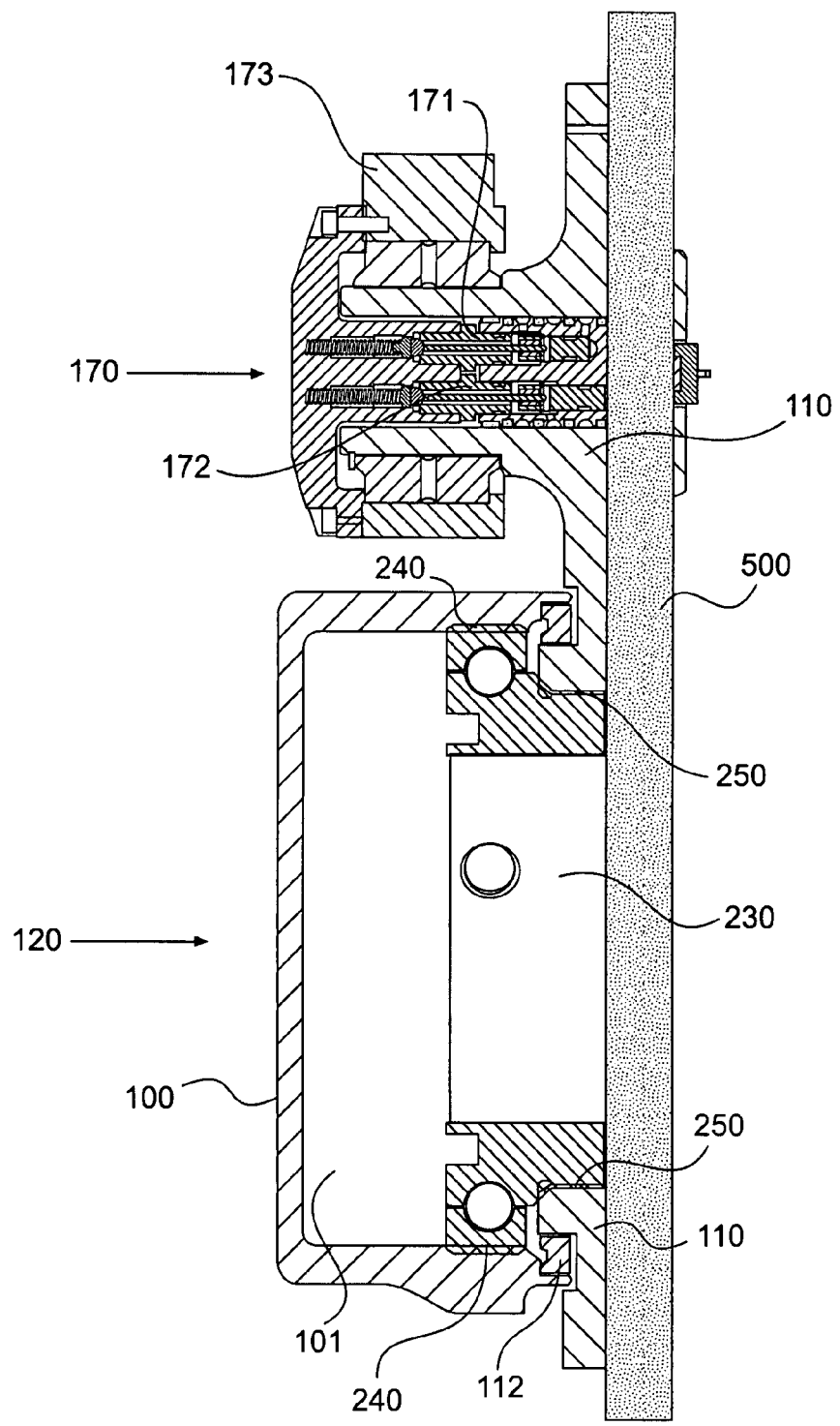
FIG. 10 is a cross-sectional view through the bearing and the multi-port assembly of the suspension system according to one aspect of the invention.

In FIG. 10, a side view with a partial cut-away of the suspension system according to one aspect of the invention is shown. The mounting plate 110 may be mounted flush against a hull of a vehicle 500. The hull 500 may also include holes for the passage of parts of the mounting plate 110 and for the passage of mechanical or electrical power components for powering the wheel assembly 10. The rotatable connections 120 and 170 may be dimensionally spaced as shown in FIG. 10 as part of the suspension unit 30 geometry. The bearing 200 is shown in further detail attached to the trailing arm 100 by the external threads 240 of the bearing 200. The bearing 200 is also shown attached to the mounting plate 110 by the external threads 250 of the bearing 200. A dirt seal 112 may also be seen in FIG. 10 to keep dirt and debris out of the interior of the rotatable connection 120 and the hollow section 101 of the trailing arm 100.

It is contemplated that the diameter of the bearing 200 may be enlarged or reduced in order to accommodate different designs and performance requirements without deviating from the scope and spirit of the invention. It should be noted that the width of the suspension unit 30 from the outside edge of the hull 500 to the outside surface of the trailing arm 100 shown in FIG. 10 may be reduced to 4 inches. This may be accomplished because of the reduced profile of the externally threaded bearing 200 allowing additional space to be utilized by the hull or the wheel assembly 10. The width of the trailing arm 100 may also be expanded and the size of the bearing 200 enlarged to accommodate additional electrical or mechanical power transmission to the wheel mount 130. A typical clearance between the hull 500 and a wheel assembly 10 may required no more than 6 inches including accommodations for chains on the tires during difficult weather conditions.

Figure 11:
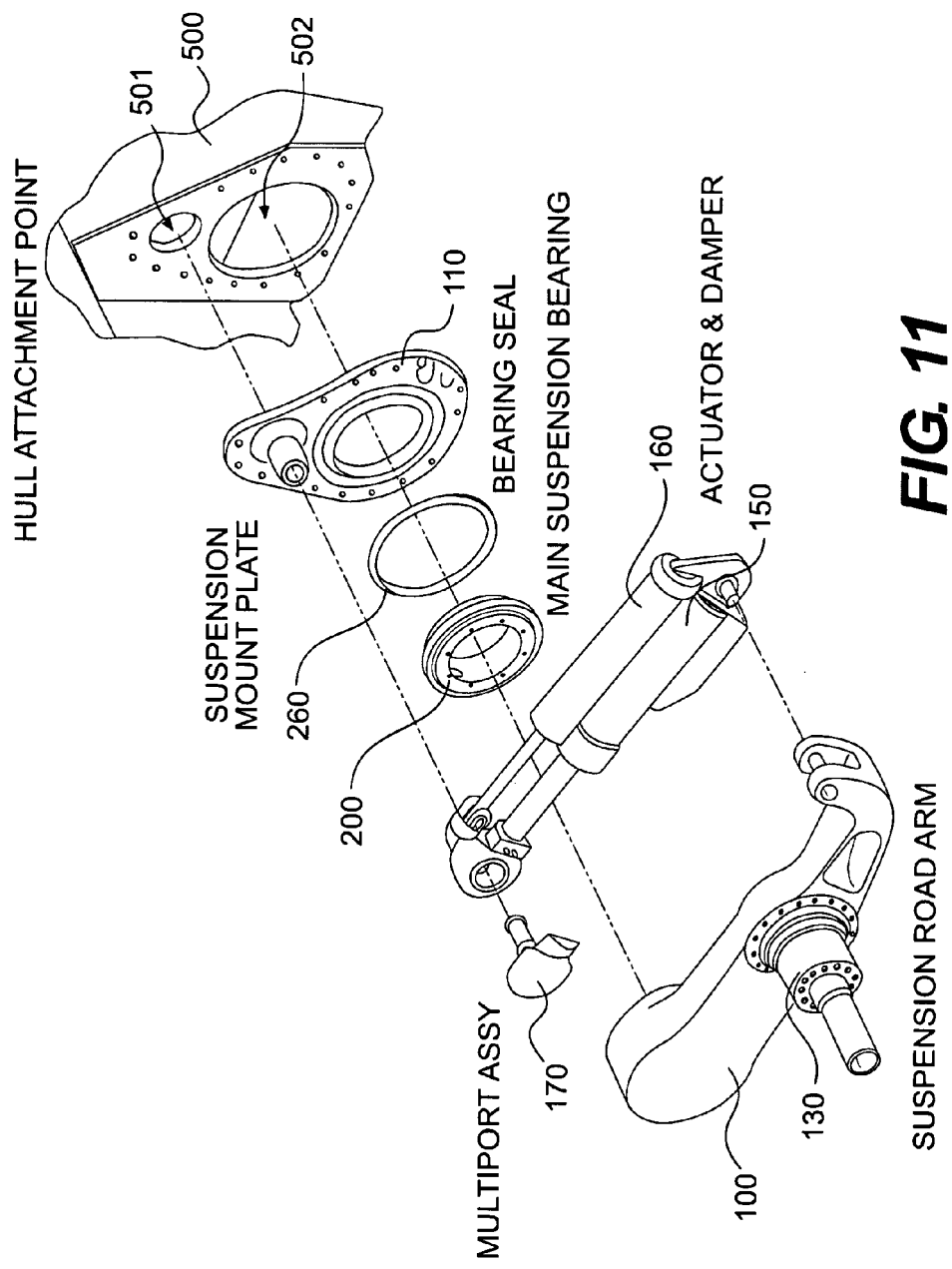
FIG. 11 is an exploded view of the suspension system as shown in FIG. 2.

FIG. 11 illustrates an exploded view of the suspension unit 30. The hull 500 may include holes 501 and 502. Hole 501 may be aligned with the multiport assembly or the connection 170 and may provide an opening for pressurized air from the gas supply vehicle control system 50 to be supplied to the valves 171 and 172 and the spring 150. The hole 502 may be aligned with the connection 120 and may provide an opening for supply lines 300 as shown in FIG. 8. The supply lines 300 may pass through the mounting plate 110, a bearing seal 260, the bearing 200, and into the hollow section 101 of the trailing arm 100. It should be noted that the only element of the suspension unit 30 that may not be applied to either the right or left hand side of a vehicle is the trailing arm 100. As such, the design of the suspension unit 30 may be simplified and cost effective by reducing fabrication and design costs of parts that may be mounted on either side of the hull 500.

It should be noted that the supply lines 300, as shown in FIG. 8, originating from the opposite side of the hull 500 from the suspension unit 30, pass through the opening 502 in the hull 500. The supply lines then pass through the suspension mounting plate 110, the bearing seal 260, the ring bearing 200 and finally into the passage 101 of the trailing arm 100. Although a slip ring may be used to pass the supply lines 300 through the bearing 200 and into the trailing arm 100, it is important to note that no slip ring is required as shown in FIG. 11 to pass the supply lines 300 from the hull 500 to the wheel mount 130.

What is claimed is:

1. A trailing arm suspension system to be interfaced between a hull of a vehicle and a wheel of the vehicle, the suspension system comprising:

an arm element having a first end and a second end, the arm element including a passage therein;

a wheel mount positioned between the first end and the second end of the arm element and connected to the passage of the arm element;

a spring element having a first end and a second end, the second end of the spring element being attached to the second end of the arm element;

a damper element having a first end and a second end, the second end of the damper element is being attached to the second end of the arm element;

a ring bearing including a first set of external threads, the first set of external threads being structured and arranged to secure the ring bearing to the arm element; and a mounting, the first end of the arm element and the mounting being rotationally connected by the ring bearing;

wherein the spring element and the damper element are positioned external to and above the arm element.

2. The suspension system according to claim 1, wherein the ring bearing further comprises a second set of external threads, the second set of external threads are structured and arranged to secure the ring bearing to the mounting plate.

3. The suspension system according to claim 1, wherein the mounting plate is symmetrical about at least one axis.

4. The suspension system according to claim 1, wherein the ring bearing and the wheel mount are connected by a mechanical transmission passing through the ring bearing and the arm element.

5. The suspension system according to claim 1, wherein the spring element includes a gas piston cylinder.

6. The suspension system according to claim 5, wherein the gas piston cylinder includes a dual-acting air cylinder with air independently supplied to both sides of the gas cylinder piston.

7. The suspension system according to claim 1, wherein the damper element is positioned above and substantially parallel to the spring element.

8. A trailing arm suspension system to be interfaced between a hull of a vehicle and a wheel of the vehicle, the suspension system comprising:

an arm element having a first end and a second end, the arm element including a passage therein;

a wheel mount positioned between the first end and the second end of the arm element and connected to the passage of the arm element;

a spring element having a first end and a second end, the second end of the spring element being attached to the second end of the arm element, the spring element positioned external to and above the arm element;

a damper element having a first end and a second end, the second end of the damper element being attached to the second end of the arm element, the damper element positioned external to and above the arm element;

a bearing coupled to the arm element; and a plurality of supply lines passing through the ring bearing and the passage of the arm element.

9. The suspension system according to claim 8, further comprising a wheel assembly mounted to the wheel mount and a plurality of connectors connecting the plurality of supply lines to the wheel assembly.

10. The suspension system according to claim 9, wherein the wheel mount further comprises a spindle and wherein the plurality of connectors are structured and arranged about the spindle.

11. The suspension system according to claim 9, wherein the wheel assembly includes an electric drive motor.

12. A suspension system to be interfaced between a hull of a vehicle and a wheel of the vehicle, the suspension system comprising:

an arm element having a first end and a second end;

a wheel mount positioned between the first end and the second end of the arm element, the wheel mount and the first end of the arm element coupled by a passage in the arm element;

a spring element having a first end and a second end, the second end of the spring element is attached to the second end of the arm element, the spring element positioned external to and above the arm element;

a damper element having a first end and a second end, the second end of the damper element is attached to the second end of the arm element, the damper element positioned external to and above the arm element; and an electric drive motor coupled on the wheel mount.

* * * * *